US008990154B2

(12) United States Patent
Behuria et al.

(10) Patent No.: US 8,990,154 B2
(45) Date of Patent: Mar. 24, 2015

(54) REQUEST DE-DUPLICATION FOR ENTERPRISE SERVICE BUS (71) Applicant: International Business Machines Corporation, Armonk, NY (US)

(72) Inventors: Ajay K. Behuria, Bentonville, AR (US); James E. Bostick, Cedar Park, TX (US); John M. Ganci, Jr., Cary, NC (US); Shashank Katare, Nagpur (IN); Shuvamoy Saha, Bentonville, AR (US); David S. Wenk, Byron Center, MI (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 13/735,115

(22) Filed: Jan. 7, 2013

(65) Prior Publication Data
US 2014/0195487 A1    Jul. 10, 2014

(51) Int. Cl.
G06F 17/30    (2006.01)
(52) U.S. Cl.
CPC .................... *G06F 17/30132* (2013.01)
USPC ............................. 707/610; 707/634
(58) Field of Classification Search
USPC ............................. 707/610, 634
See application file for complete search history.

(56) References Cited

U.S. PATENT DOCUMENTS

| 7,899,991 | B2* | 3/2011 | Rajkumar et al. | 711/118 |
|---|---|---|---|---|
| 7,917,468 | B2* | 3/2011 | Ariel et al. | 707/610 |
| 8,015,343 | B2* | 9/2011 | Garman et al. | 711/100 |
| 8,046,432 | B2* | 10/2011 | Yoo et al. | 709/217 |
| 8,055,104 | B2 | 11/2011 | Dawson et al. | |
| 8,095,670 | B2 | 1/2012 | Brown et al. | |
| 8,151,004 | B1* | 4/2012 | Ufimtsev et al. | 709/246 |
| 8,255,375 | B2 | 8/2012 | Rangarajan et al. | |
| 8,271,396 | B2* | 9/2012 | Ronning et al. | 705/75 |
| 2007/0198368 | A1* | 8/2007 | Kannan et al. | 705/26 |
| 2010/0262549 | A1* | 10/2010 | Kannan et al. | 705/304 |

* cited by examiner

*Primary Examiner* — Kim Nguyen
(74) *Attorney, Agent, or Firm* — Schmeiser, Olsen & Watts; John R. Pivnichny (57) ABSTRACT A method and system for providing temporary storage associated with a duplication request. The method includes authenticating a user accessing a system. A service request for performing service functions is received. Specified data associated with performing service functions is received from a third party vendor and description metadata is added to the specified data. The service functions are executed using the specified data. Results of the executed service functions are generated. An additional service request for performing additional service functions is received and intercepted. The description metadata is compared to previous service requests stored in a temporary storage system.

20 Claims, 10 Drawing Sheets

REQUEST DE-DUPLICATION FOR ENTERPRISE SERVICE BUS

FIELD

One or more embodiments of the invention relate generally to a method for preventing duplicate service requests, and in particular to a method and associated system for using temporary data storage for preventing duplicate service requests between parties in flight.

BACKGROUND

Temporarily storing data typically includes an inaccurate process with little flexibility. Determining data for temporary storage may include a complicated process that may be time consuming and require a large amount of resources. Accordingly, there exists a need in the art to overcome at least some of the deficiencies and limitations described herein above.

SUMMARY

A first embodiment of the invention provides a method comprising: authenticating, by a computer processor of a computing system, a user of a system; accessing, by the computer processor executing an agent in an enterprise service bus (ESB), the system; receiving, by the computer processor executing the agent, a service request for performing service functions, the service request comprising description metadata; receiving from a third party vendor, by the computer processor executing the agent, specified data associated with the performing the service functions; adding, by the computer processor, the description metadata to the specified data; executing, by the computer processor via a call to the third party vendor, the service functions using the specified data; generating, by the computer processor, results of the executing, the results comprising a response to the service request; receiving, by the computer processor executing the agent, an additional service request for performing additional service functions; intercepting, by the computer processor, the additional service request; and comparing, by the computer processor, the description metadata to all previous service requests stored in a temporary storage system.

A second embodiment of the invention provides a computer program product, comprising a computer readable storage device storing a computer readable program code, the computer readable program code comprising an algorithm that when executed by a computer processor of computing system implements a method, the method comprising: authenticating, by the computer processor, a user of a system; accessing, by the computer processor executing an agent in an enterprise service bus (ESB), the system; receiving, by the computer processor executing the agent, a service request for performing service functions, the service request comprising description metadata; receiving from a third party vendor, by the computer processor executing the agent, specified data associated with the performing the service functions; adding, by the computer processor, the description metadata to the specified data; executing, by the computer processor via a call to the third party vendor, the service functions using the specified data; generating, by the computer processor, results of the executing, the results comprising a response to the service request; receiving, by the computer processor executing the agent, an additional service request for performing additional service functions; intercepting, by the computer processor, the additional service request; and comparing, by the computer processor, the description metadata to all previous service requests stored in a temporary storage system.

A third embodiment of the invention provides a computer system comprising a computer processor coupled to a computer-readable memory unit, the memory unit comprising instructions that when executed by the computer processor implements a method comprising: authenticating, by the computer processor, a user of a system; accessing, by the computer processor executing an agent in an enterprise service bus (ESB), the system; receiving, by the computer processor executing the agent, a service request for performing service functions, the service request comprising description metadata; receiving from a third party vendor, by the computer processor executing the agent, specified data associated with the performing the service functions; adding, by the computer processor, the description metadata to the specified data; executing, by the computer processor via a call to the third party vendor, the service functions using the specified data; generating, by the computer processor, results of the executing, the results comprising a response to the service request; receiving, by the computer processor executing the agent, an additional service request for performing additional service functions; intercepting, by the computer processor, the additional service request; and comparing, by the computer processor, the description metadata to all previous service requests stored in a temporary storage system.

The present invention advantageously provides a simple method and associated system capable of temporarily storing data.

BRIEF DESCRIPTION OF THE DRAWINGS

FIG. 1, including FIGS. 1A, 1B, and 1C, illustrates a system for providing temporary data storage associated with a duplication request, in accordance with embodiments of the present invention.

FIG. 2, including FIGS. 2A, 2B, and 2C, illustrates an alternative system to the system of FIG. 1, in accordance with embodiments of the present invention.

FIG. 4 including

DETAILED DESCRIPTION

Figures 1, 1A:
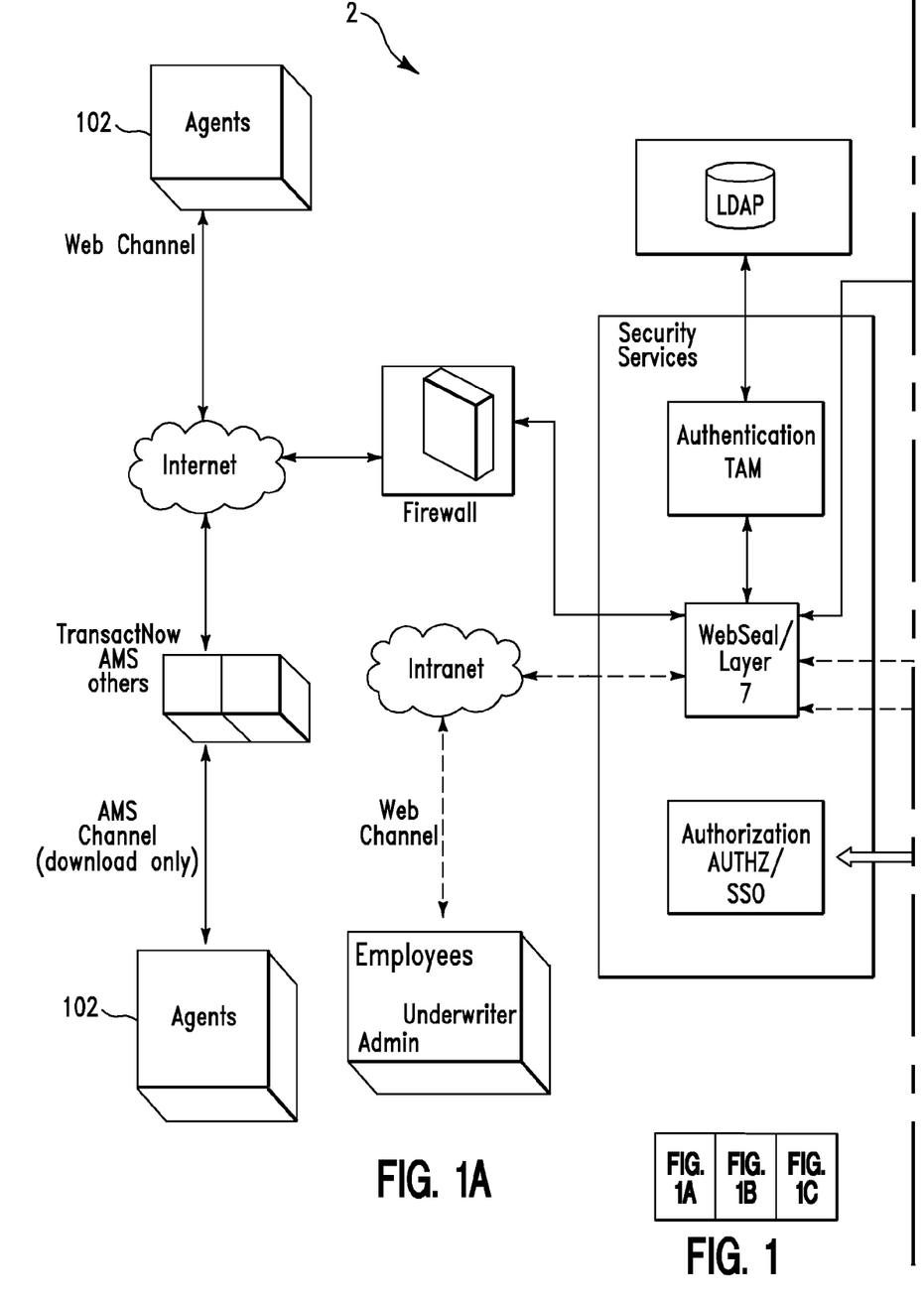
Figure 1B:
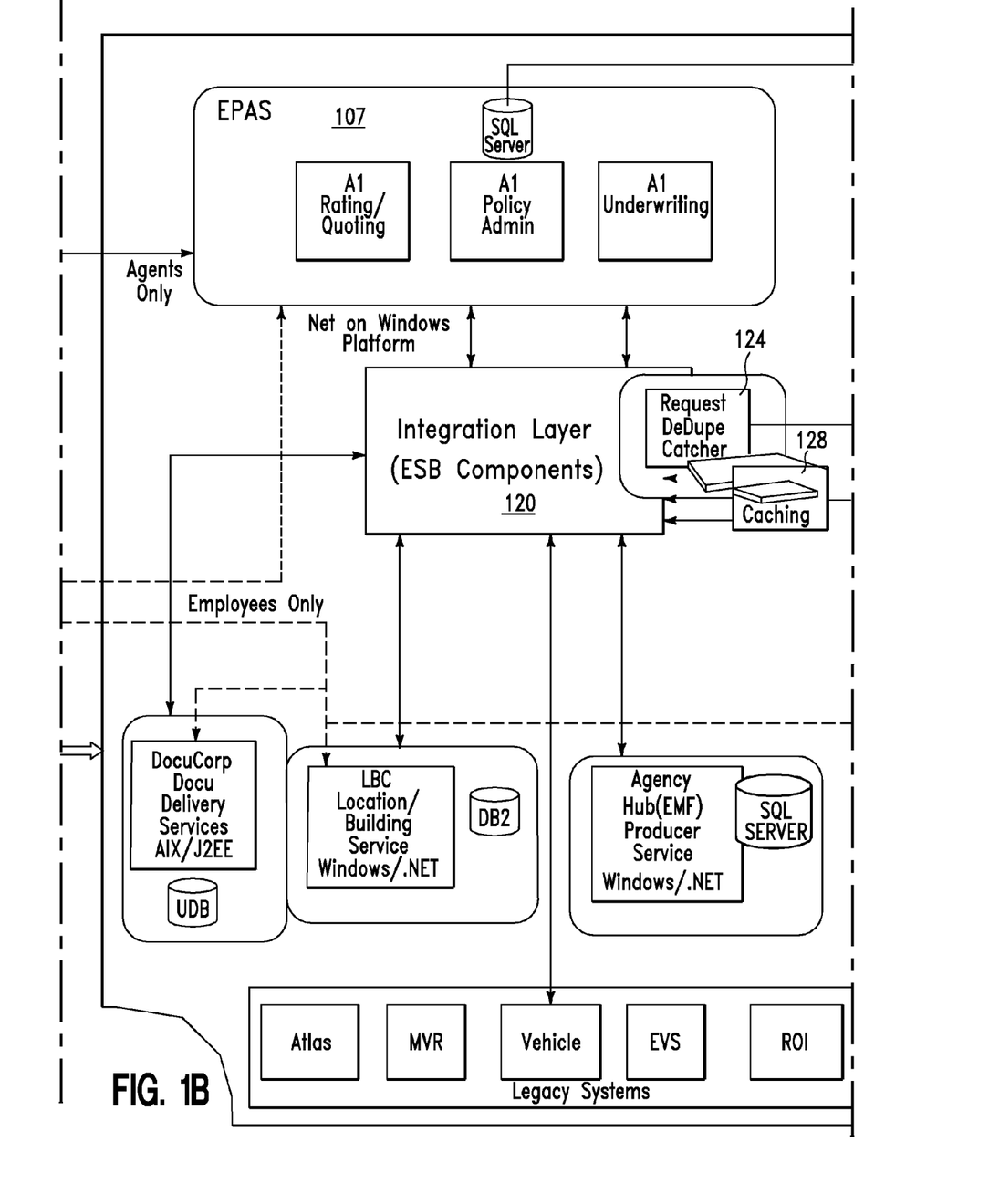
Figure 1C:
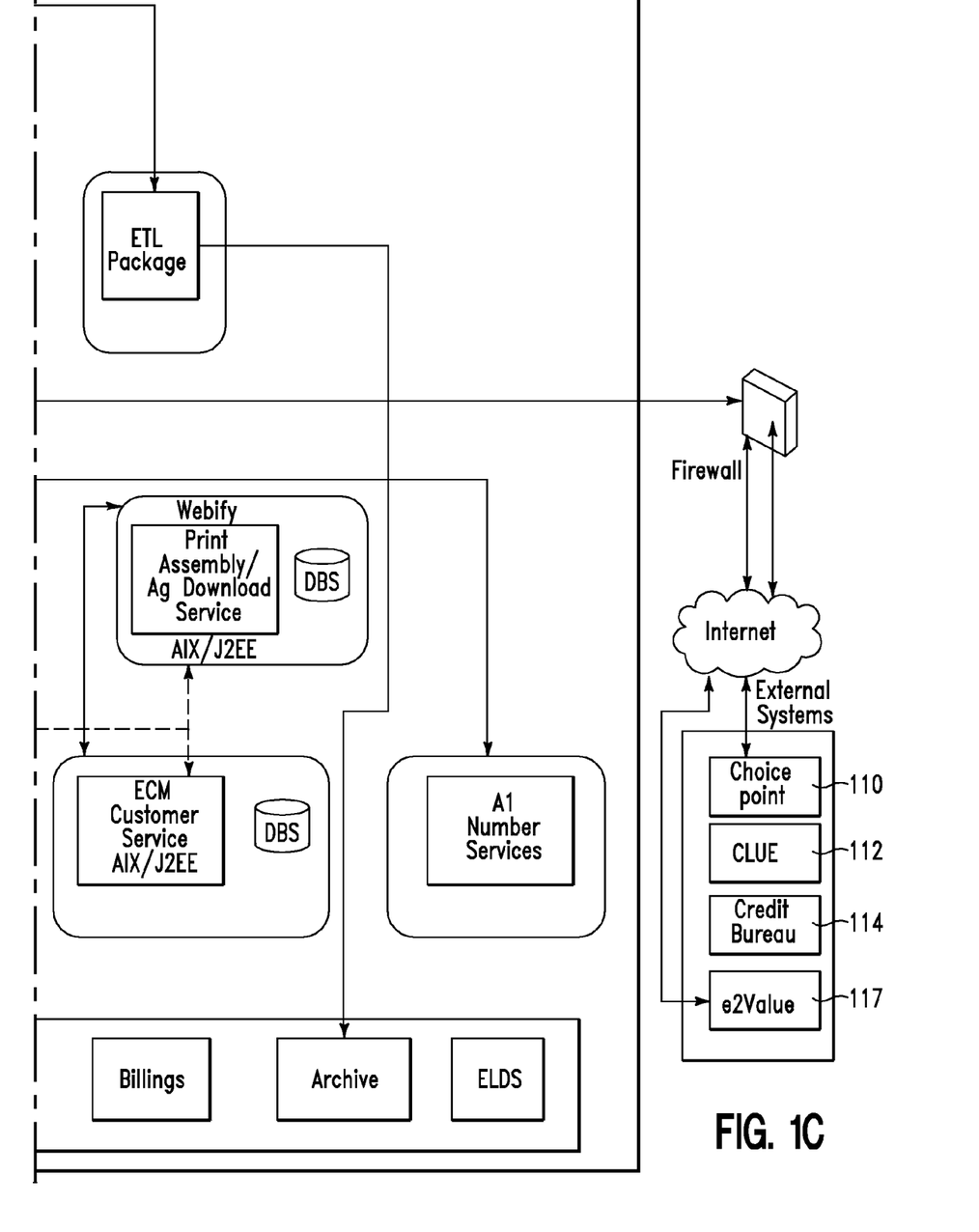

FIG. 1, including FIGS. 1A, 1B, and 1C, illustrates a system 2 for providing temporary data storage associated with a duplication request, in accordance with embodiments of the present invention. The above and other features of the present invention will become more distinct by a detailed description of embodiments shown in combination with attached drawings. Identical reference numbers represent the same or similar parts in the attached drawings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 2 comprises a system for:
1. Selectively adding metadata from service request data;
2. Identifying a request message in an Enterprise Service Bus (ESB) component.
3. Querying a repository for previous identical requests.
4. Notifying a service consumer if a duplicate request is identified.

System 2 selectively adds metadata from a service request data to distinctively identify a request message in an ESB mediator component. For example, a VIN, year, make, and model of an automobile may be used to uniquely identify a service request message.

System 2 of FIG. 1 includes agents 102 accessing an enterprise policy administration system (EPAS) 107. Although system 2 is described with respect to an enterprise policy administration system, note that system 2 may be implemented as any type of computing system. Third party software as a service (SaaS) applications: choice point 110, CLUE 112, credit bureau 114, and e2Value 117 provide information based on a pay per use model. Enterprise service bus (ESB) 120 comprises an architectural pattern followed in integration scenarios. ESB 120 facilitates all integration processes between a service consumer and a service provider. System 2 enables a concept whereby all service request messages between a provider and a consumer are intercepted to determine duplicate requests. The duplicate requests are determined by comparing data with pre-configured metadata associated with a message. If a duplicate message is identified, an integration component retrieves associated data from an internal cache 128 (within integration layer 120) instead of a service provider.

System 2 of FIG. 1 enables a process such that when a service requestor invokes a service, an ESB mediator (of integration layer 120) queries a repository to determine if a previous request (i.e., duplicate request) with identical request information exists. If a duplicate request is identified, then an ESB de-dupe catcher 124 responds to a service consumer with information retrieved from internal cache 128 instead of invoking a service provider.

System 2 of FIG. 1 allows:
1. A user to selectively choose metadata information within integration layer 120 from a service request message dictionary to form context data uniquely identifying a request.
2. Enhance performance due to a service consumer's ability to retrieve data from an enterprise cache instead of invoking a service provider.
3. Prevention of revenue loss when a service provider charges for each and every service request.
4. An ESB pattern or functionality to be reused without hard coding.

System 2 stores an encrypted response (in a local database for a specified time period) with context information (e.g., a credit card holder name, a last 4 digits of a credit card number, etc). For example, an ESB service queries a local cache with the context information in order to prevent a 3rd-party call if a same credit card was recently used. The local cache allows quick access to recently used data and prevents additional data transfer charges. The cached information may be periodically flushed so that if a user returns after a longer period of time, his/her credit card details have been deleted and a 3rd-party call (for the data) is required.

Figures 2, 2A:
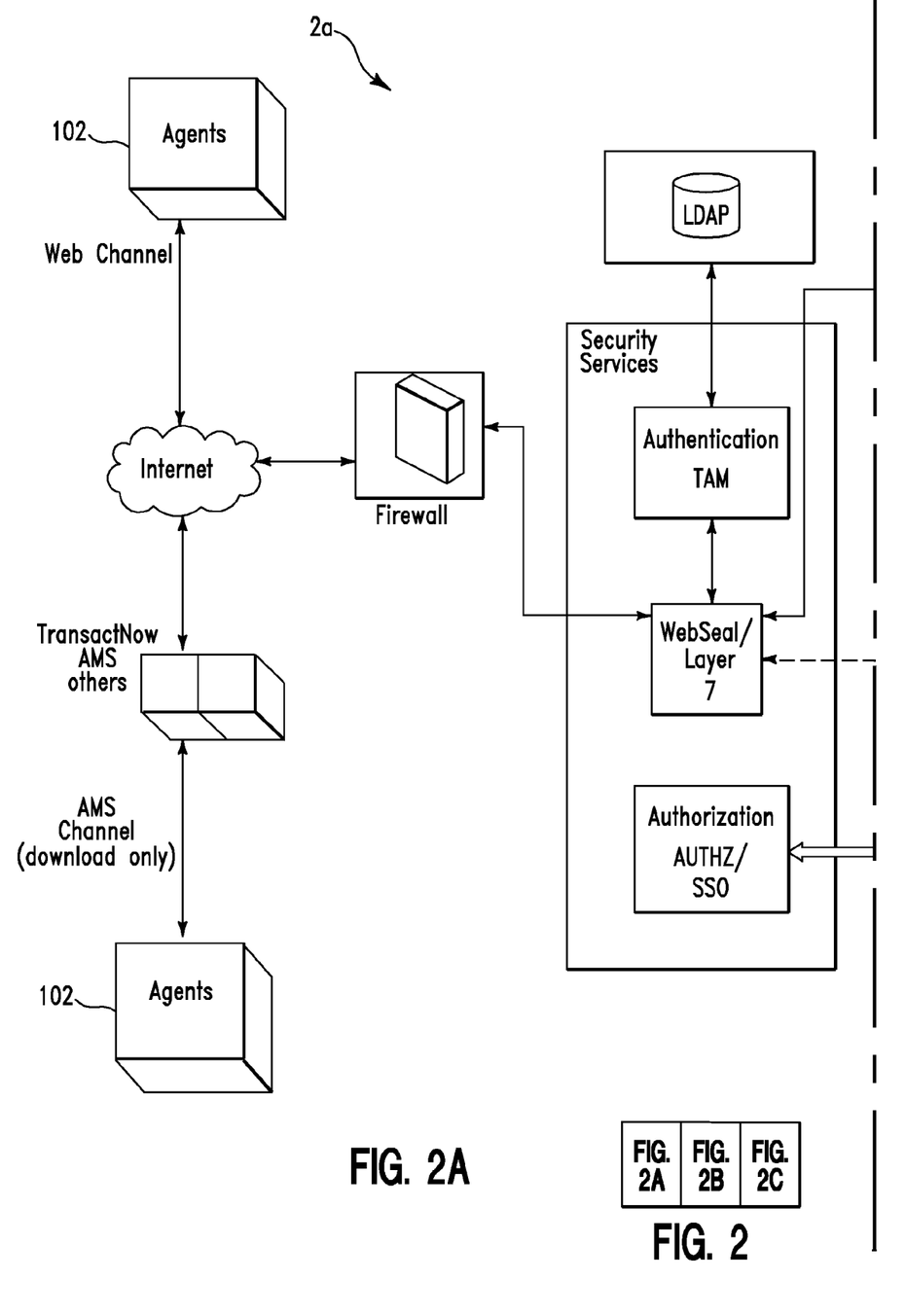
Figure 2B:
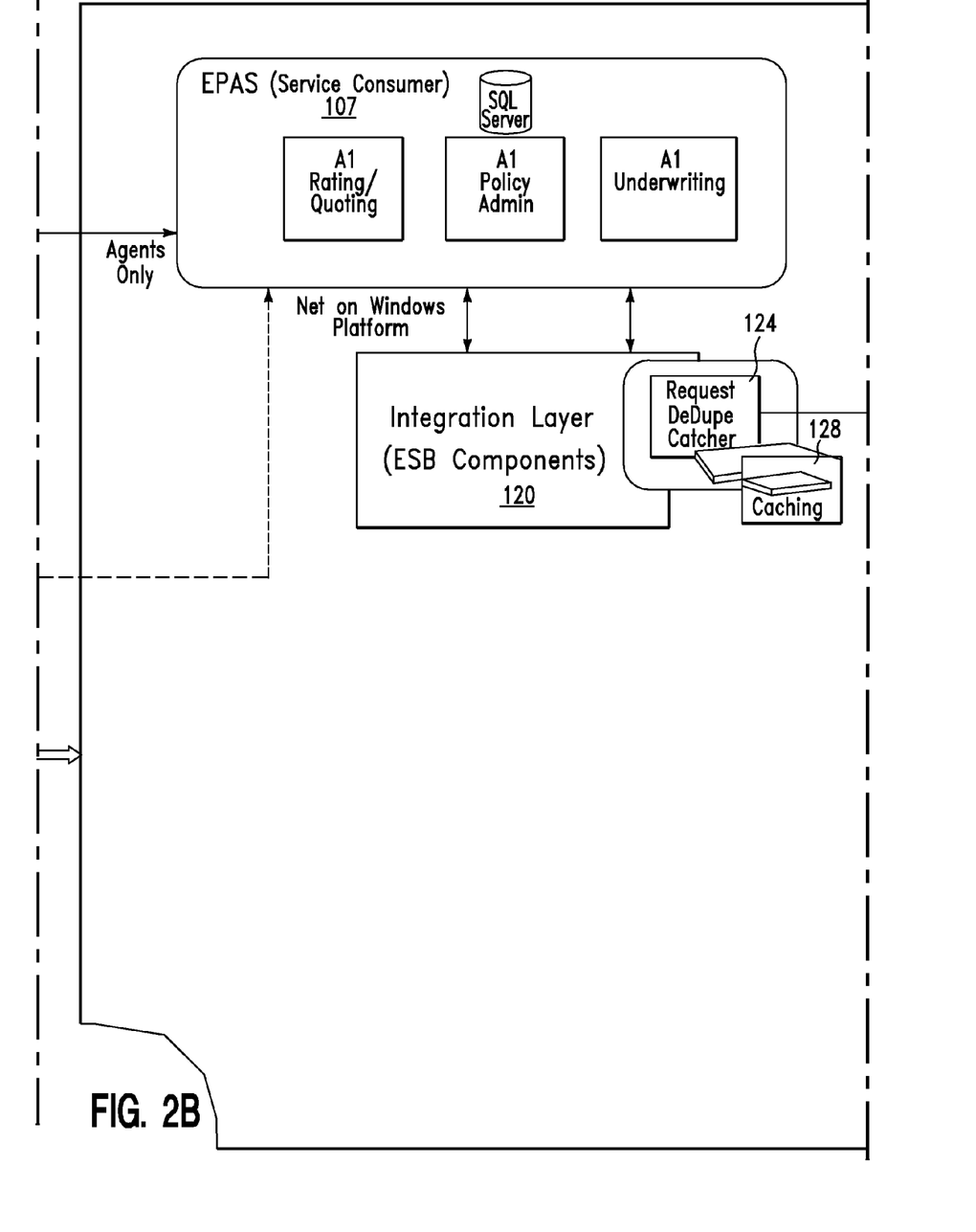
Figure 2C:
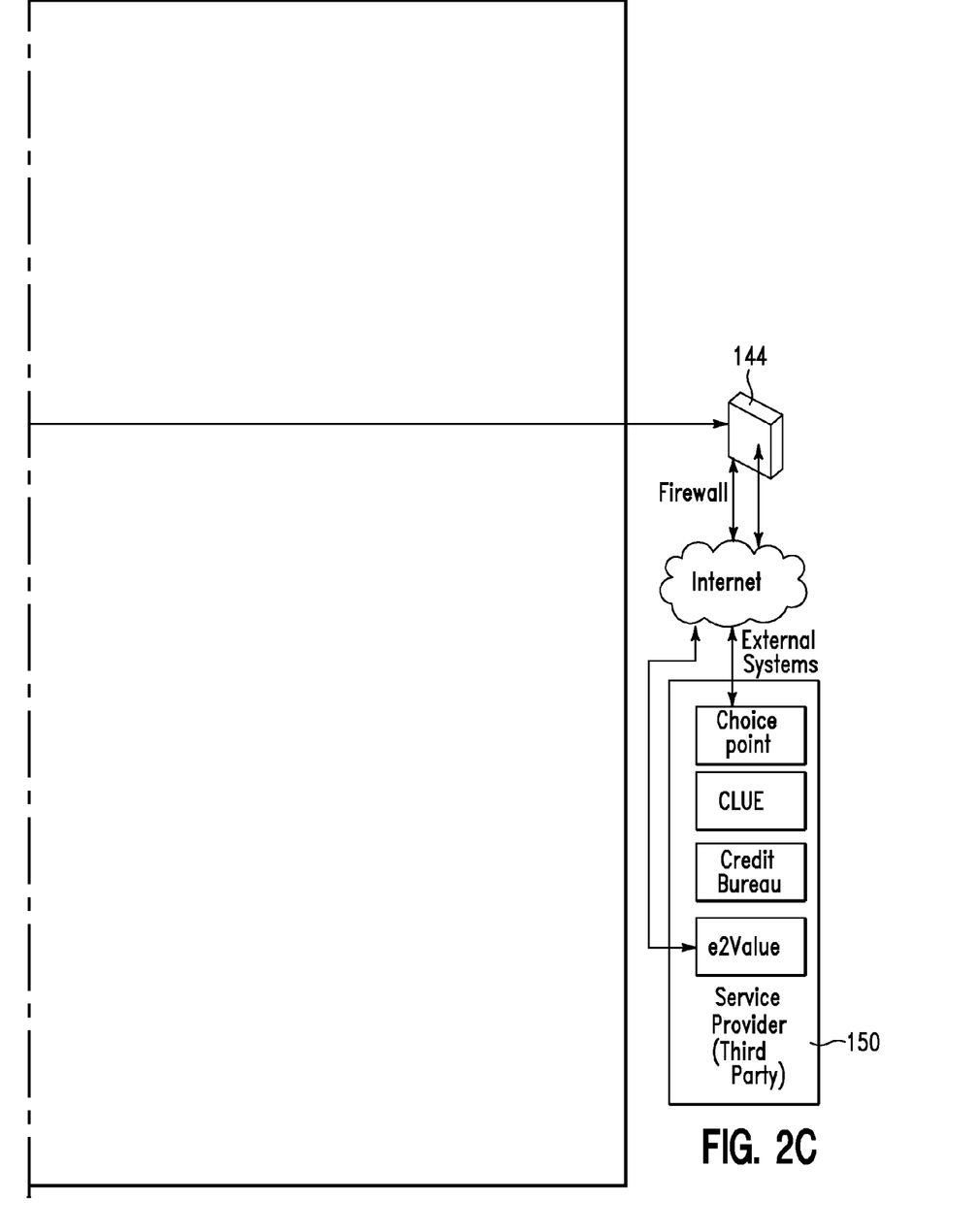

FIG. 2, including FIGS. 2A, 2B, and 2C, illustrates an alternative system 2a to system 2 of FIG. 1, in accordance with embodiments of the present invention. The following process describes implementation example enabled by system 2a of FIG. 2:
1. An insurance agent logs into an enterprise policy administration system (system 2a) via a web browser 206.
2. Web browser 206 navigates via a company firewall 107.
3. The enterprise policy administration system performs an authentication & authorization service via security services (i.e., firewall 107).
4. Upon a successful authentication & authorization, an agent 102 accesses the policy administration system.
5. The policy administration system (in order to accomplish policy quotation, creation, and update business process steps) requires access to information from third party service providers (i.e., over an beyond legacy applications within the enterprise).
6. All service request mediation occurs via integration layer 120 (i.e., enterprise service components).
7. A mediation component checks for duplicate request message data by comparing with the message data with pre-configured metadata information and upon locating a duplicate request data is retrieved from cache 128.
9. If the request data is unique (i.e., not a duplicate), a mediation component transmits the request to a third party service providers 150 via a firewall 144. In response, third party service providers 150 transmit a response back to integration layer 120 with requested information.
10. Integration layer 120 responds back to the policy administration system (service consumer) for agents 102 to continue with remaining activities of a business process.

Figure 3:
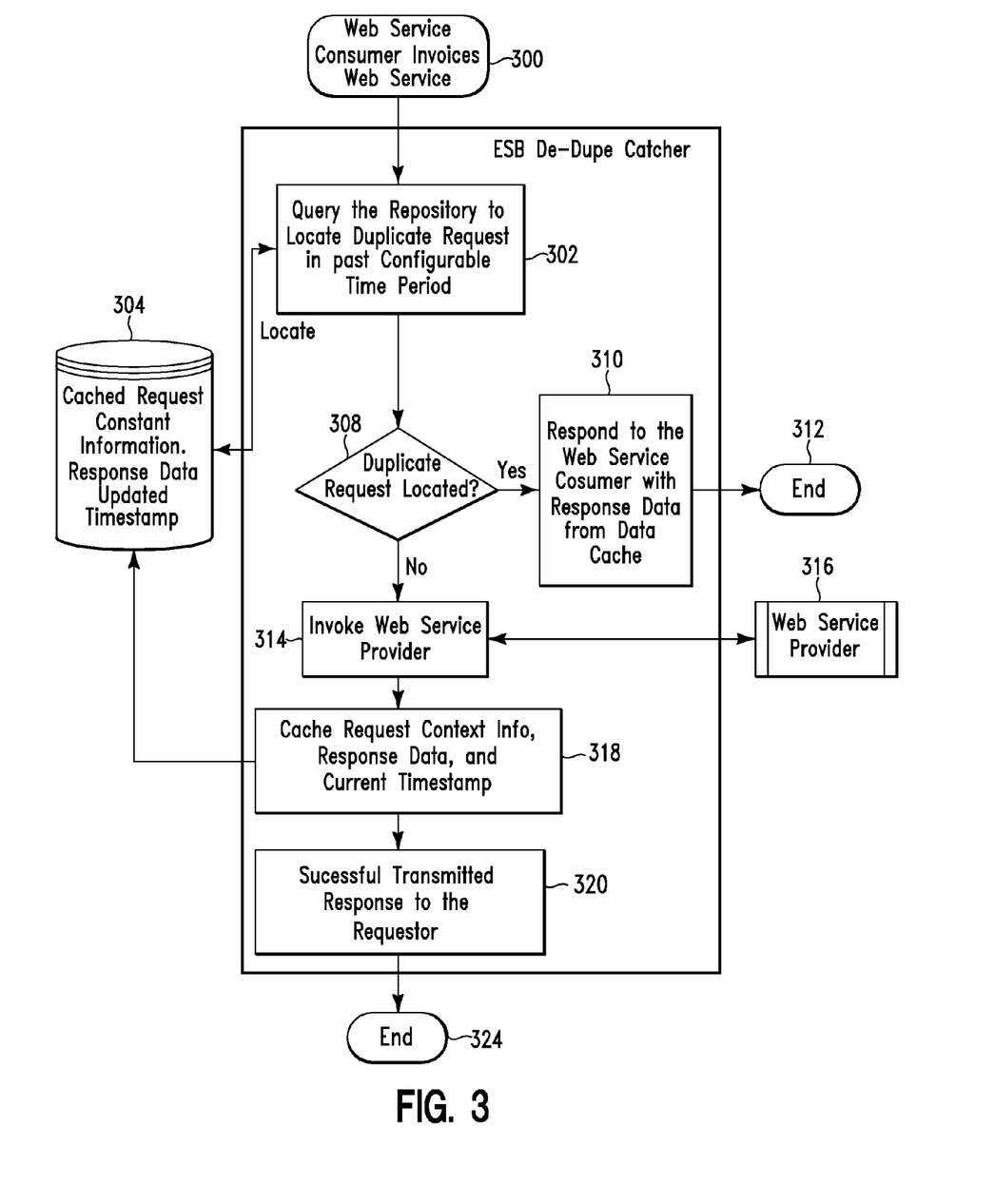
FIG. 3 illustrates an algorithm detailing a process flow enabled by the system of FIG. 1 and/or the system of FIG. 2 for determining a duplication request, in accordance with embodiments of the present invention.

FIG. 3 illustrates an algorithm detailing a process flow enabled by system 2 of FIG. 1 and/or system 2a of FIG. 2 for determining a duplication request 2, in accordance with embodiments of the present invention. The algorithm of FIG. 3 illustrates an ESB de-dupe catcher implemented as a mediator component. In step 300, a Web service consumer invokes a Web service. In step 302, a repository is queried to locate a duplicate request in a past configurable time period. In step 308, it is determined if a duplicate request has been located. If in step 308, it is determined that a duplicate request has been located then in step 310, the system responds to a Web service consumer with response data from a data cache and the process is terminated it step 312. If in step 308, it is determined that a duplicate request has not been located then in step 314, a Web service provider 316 is invoked. In step 318, Request context information, response data, and a current timestamp are cached in cache 304. In step 320, a successful response is transmitted to the requestor and the process is terminated in step 324.

Figure 4:
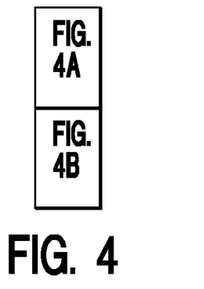
Figure 4A:
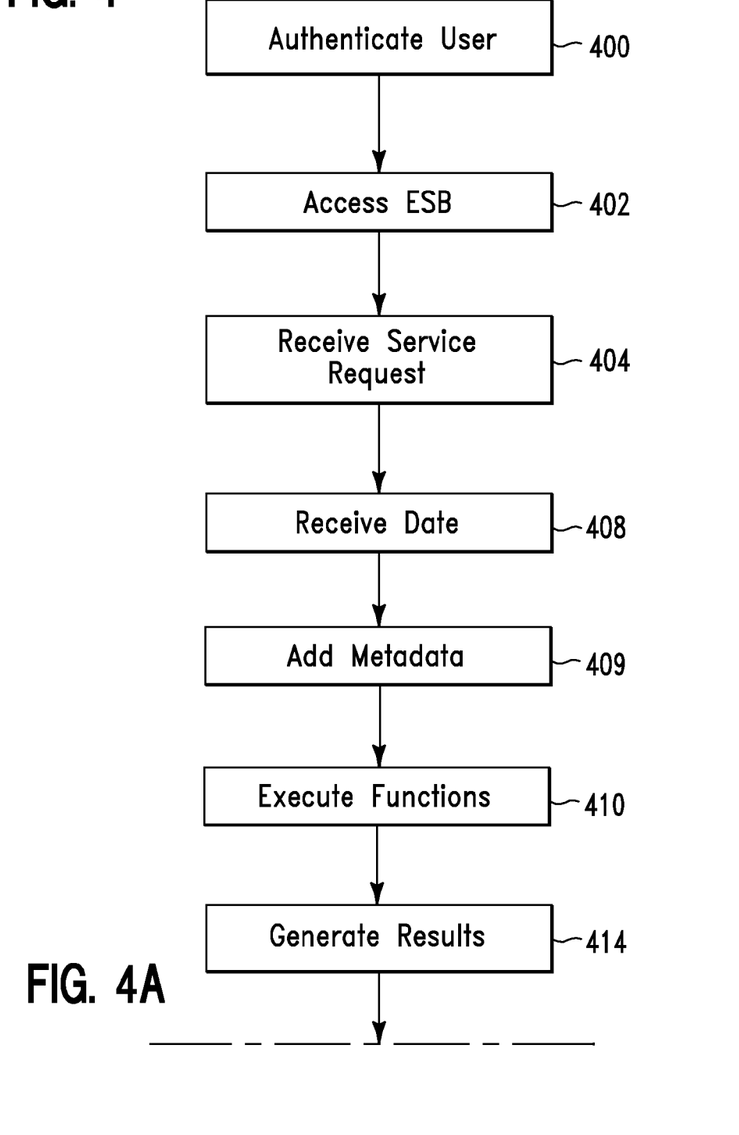
FIGS. 4A and 4B, illustrates an algorithm detailing a process flow enabled by the system of FIG. 1 and/or the system of FIG. 2 for providing temporary data storage associated with a duplication request, in accordance with embodiments of the present invention.
Figure 4B:
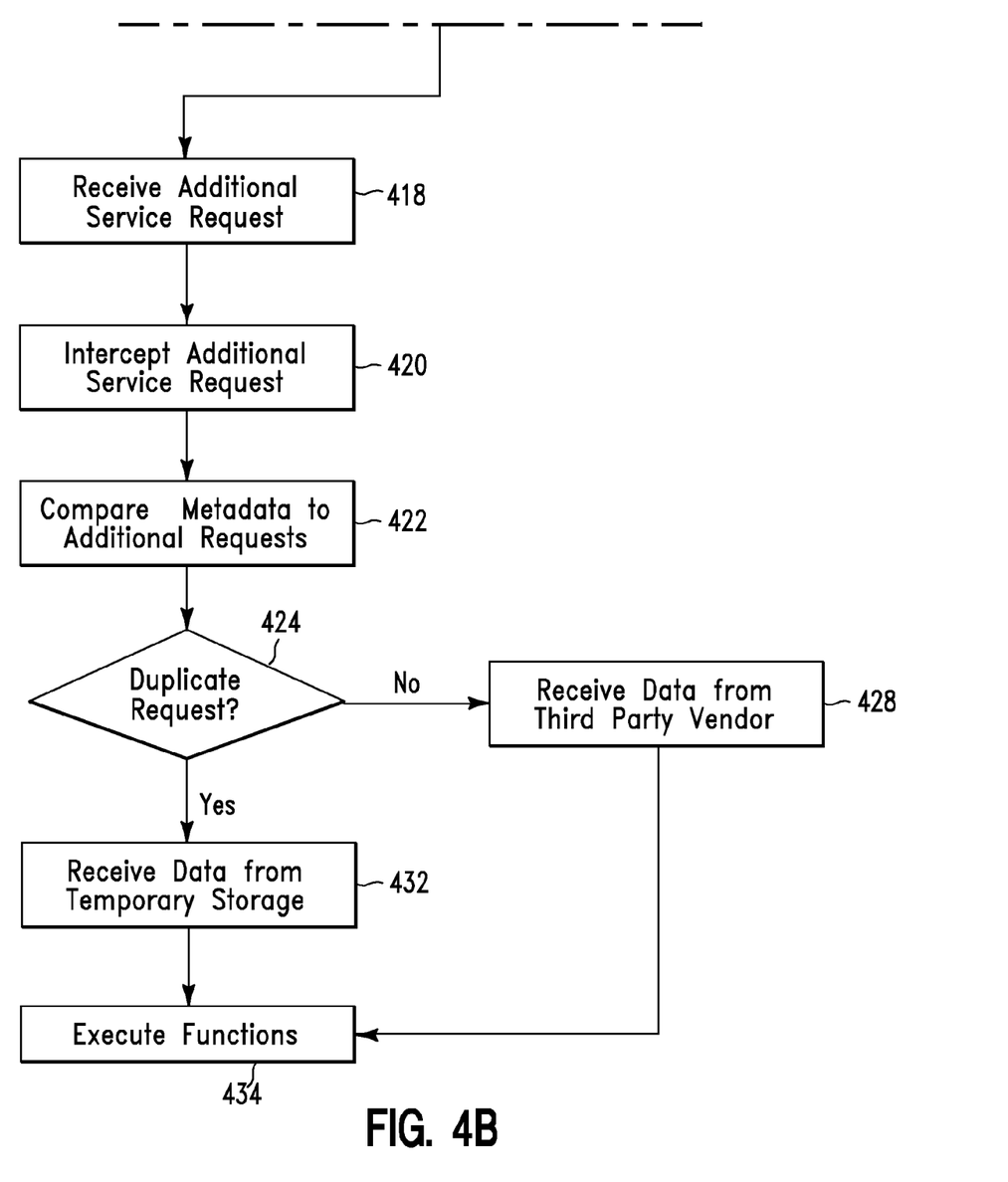

FIG. 4, including FIGS. 4A and 4B, illustrates an algorithm detailing a process flow enabled by system 2 of FIG. 1 and/or system 2a of FIG. 2 for providing temporary data storage associated with a duplication request, in accordance with embodiments of the present invention. In step 400, a user of an enterprise policy administration system is authenticated. In step 402, a computer processor (of a computing system) executing an agent in an enterprise service bus (ESB) accesses the enterprise policy administration system. In step 404, the computer processor receives a service request for performing service functions. The service request includes description metadata. In step 408, specified data associated with performing the service functions is received from a third party vendor. In step 409, the description metadata is added to the specified data. In step 410, the service functions (using the specified data) are executed via a call to the third party vendor. In step 414, results of the executed service functions are generated. The results include a response to the service request. In step 418, an additional service request for performing additional service functions is received and intercepted. In step 422, the description metadata is compared to all previous service requests stored in a temporary storage system (e.g., a cache). In step 424, it is determined (based in results of step 422) if the additional service request comprises a duplicate request of the service request. If in step 424 it is determined that the additional service request comprises a duplicate request of the service request then in step 432, the specified data is retrieved from the temporary storage system and in step 434 the service functions are executed using the specified data. If in step 424 it is determined that the additional service request does not comprise a duplicate request of the service request then in step 428, the additional data is retrieved from the third party vendor and in step 434 the service functions are executed using the additional data.

Figure 5:
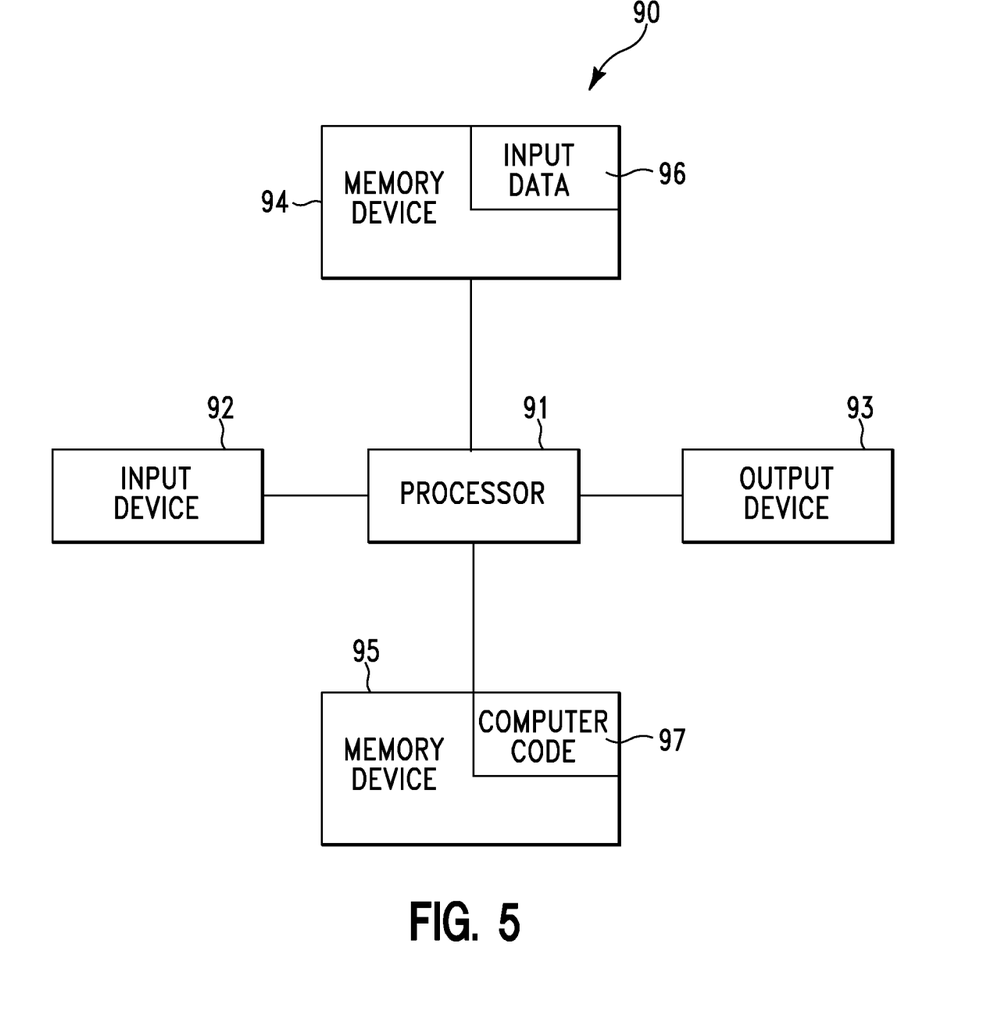
FIG. 5 illustrates a computer apparatus used by the system of FIG. 1 for providing temporary data storage associated with a duplication request, in accordance with embodiments of the present invention.

FIG. 5 illustrates a computer apparatus 90 used by system 2 of FIG. 1 for providing temporary data storage associated with a duplication request, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for providing temporary data storage associated with a duplication request. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithms of FIGS. 3 and 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to deliver targeted advertisements and offers to a user based on a hardware device belonging to the user. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for delivering targeted advertisements and offers to provide temporary data storage associated with a duplication request. In another embodiment, the invention provides a business method that performs the process steps of the invention on a subscription, advertising, and/or fee basis. That is, a service supplier, such as a Solution Integrator, could offer to provide temporary data storage associated with a duplication request. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A method comprising:
authenticating, by a computer processor of a computing system, a user of a system;
accessing, by said computer processor executing an agent in an enterprise service bus (ESB), said system;
receiving, by said computer processor executing said agent, a service request for performing service functions;
selecting, by said computer processor from a service request message dictionary of an integration layer in response to a user command, description metadata configured to form context data uniquely identifying said service request;
receiving from a third party vendor, by said computer processor executing said agent, specified data associated with said performing said service functions;
adding, by said computer processor, said description metadata to said specified data;
executing, by said computer processor via a call to said third party vendor, said service functions using said specified data;
generating, by said computer processor, results of said executing, said results comprising a response to said service request;

receiving, by said computer processor executing said agent, an additional service request for performing additional service functions;

intercepting, by said computer processor, said additional service request;

comparing, by said computer processor executing a mediation component, said description metadata to all previous service requests stored in a temporary storage system, wherein said comparing comprises querying a repository to determine if a duplicate request of said service request has been executed within a past specified time period; and determining, by said computer processor in response to results of said comparing, if said additional service request comprises said duplicate request or if said additional service request differs from any previous service requests.

2. The method of claim 1, wherein results of said determining determines that said additional service request comprises said duplicate request, and wherein said method further comprises:

retrieving, by said computer processor from said temporary storage system, said specified data.

3. The method of claim 1, wherein results of said determining determines that said additional service request differs from any previous service requests, and wherein said method further comprises:

retrieving, by said computer processor from said third party vendor, additional data;

executing, by said computer processor, additional service functions using said additional data; and storing in a temporary storage system, by said computer processor, said specified data comprising said description metadata and said results.

4. The method of claim 3, wherein said temporary storage system comprises a cache storage system.

5. The method of claim 4, wherein said cache storage system is comprised by said computer processor.

6. The method of claim 3, further comprising:

determining, by said computer processor, that a specified period of time has elapsed since said storing said specified data comprising said description metadata and said results in said temporary storage system; and removing, by said computer processor, said specified data from said temporary storage system.

7. The method of claim 1, wherein said request is executed within an integration layer of an enterprise policy administration system.

8. The method of claim 1, further comprising: providing a process for supporting computer infrastructure, said process comprising providing at least one support service for at least one of creating, integrating, hosting, maintaining, and deploying computer-readable code in the computing system, wherein the code in combination with the computing apparatus is configured to perform the method of claim 1.

9. A computer program product, comprising a computer readable hardware storage device storing a computer readable program code, said computer readable program code comprising an algorithm that when executed by a computer processor of computing system implements a method, said method comprising:

authenticating, by said computer processor, a user of a system;

accessing, by said computer processor executing an agent in an enterprise service bus (ESB), said system;

receiving, by said computer processor executing said agent, a service request for performing service functions;

selecting, by said computer processor from a service request message dictionary of an integration layer in response to a user command, description metadata configured to form context data uniquely identifying said service request;

receiving from a third party vendor, by said computer processor executing said agent, specified data associated with said performing said service functions;

adding, by said computer processor, said description metadata to said specified data;

executing, by said computer processor via a call to said third party vendor, said service functions using said specified data;

generating, by said computer processor, results of said executing, said results comprising a response to said service request;

receiving, by said computer processor executing said agent, an additional service request for performing additional service functions;

intercepting, by said computer processor, said additional service request;

comparing, by said computer processor executing a mediation component, said description metadata to all previous service requests stored in a temporary storage system, wherein said comparing comprises querying a repository to determine if a duplicate request of said service request has been executed within a past specified time period; and determining, by said computer processor in response to results of said comparing, if said additional service request comprises said duplicate request or if said additional service request differs from any previous service requests.

10. The computer program product of claim 9, wherein results of said determining determines that said additional service request comprises said duplicate request, and wherein said method further comprises:

retrieving, by said computer processor from said temporary storage system, said specified data.

11. The computer program product of claim 9, wherein results of said determining determines that said additional service request differs from any previous service requests, and wherein said method further comprises:

retrieving, by said computer processor from said third party vendor, additional data;

executing, by said computer processor, additional service functions using said additional data; and storing in a temporary storage system, by said computer processor, said specified data comprising said description metadata and said results.

12. The computer program product of claim 11, wherein said temporary storage system comprises a cache storage system.

13. The computer program product of claim 12, wherein said cache storage system is comprised by said computer processor.

14. The computer program product of claim 11, wherein said method further comprises:

determining, by said computer processor, that a specified period of time has elapsed since said storing said specified data comprising said description metadata and said results in said temporary storage system; and removing, by said computer processor, said specified data from said temporary storage system.

15. The computer program product of claim 9, wherein said request is executed within an integration layer of an enterprise policy administration system.

16. A computer system comprising a computer processor coupled to a computer-readable memory unit, said memory unit comprising instructions that when executed by the computer processor implements a method comprising:

authenticating, by said computer processor, a user of a system;

accessing, by said computer processor executing an agent in an enterprise service bus (ESB), said system;

receiving, by said computer processor executing said agent, a service request for performing service functions;

selecting, by said computer processor from a service request message dictionary of an integration layer in response to a user command, description metadata configured to form context data uniquely identifying said service request;

receiving from a third party vendor, by said computer processor executing said agent, specified data associated with said performing said service functions;

adding, by said computer processor, said description metadata to said specified data;

executing, by said computer processor via a call to said third party vendor, said service functions using said specified data;

generating, by said computer processor, results of said executing, said results comprising a response to said service request;

receiving, by said computer processor executing said agent, an additional service request for performing additional service functions;

intercepting, by said computer processor, said additional service request;

comparing, by said computer processor executing a mediation component, said description metadata to all previous service requests stored in a temporary storage system, wherein said comparing comprises querying a repository to determine if a duplicate request of said service request has been executed within a past specified time period; and determining, by said computer processor in response to results of said comparing, if said additional service request comprises said duplicate request or if said additional service request differs from any previous service requests.

17. The computer system of claim 16, wherein results of said determining determines that said additional service request comprises said duplicate request, and wherein said method further comprises:

retrieving, by said computer processor from said temporary storage system, said specified data.

18. The computer system of claim 16, wherein results of said determining determines that said additional service request differs from any previous service requests, and wherein said method further comprises:

retrieving, by said computer processor from said third party vendor, additional data;

executing, by said computer processor, additional service functions using said additional data; and storing in a temporary storage system, by said computer processor, said specified data comprising said description metadata and said results.

19. The computer system of claim 18, wherein said temporary storage system comprises a cache storage system.

20. The computer system of claim 19, wherein said cache storage system is comprised by said computer processor.

* * * * *